US011587293B2

United States Patent
Salminen (10) Patent No.: US 11,587,293 B2
(45) Date of Patent: Feb. 21, 2023

(54) PROVIDING LOCATION-BASED AUGMENTED REALITY CONTENT

(71) Applicant: HUAWEI TECHNOLOGIES CO., LTD., Guangdong (CN)

(72) Inventor: Karoliina Taru Katriina Salminen, Helsinki (FI)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/992,447

(22) Filed: Aug. 13, 2020

(65) Prior Publication Data

US 2020/0372721 A1 Nov. 26, 2020

Related U.S. Application Data

(63) Continuation of application No. PCT/EP2018/071131, filed on Aug. 3, 2018.

(51) Int. Cl.
*G06T 19/00* (2011.01)
*H04W 4/029* (2018.01)
*H04W 4/02* (2018.01)

(52) U.S. Cl.
CPC .......... *G06T 19/006* (2013.01); *H04W 4/025* (2013.01); *H04W 4/029* (2018.02)

(58) Field of Classification Search
None
See application file for complete search history.

(56) References Cited

U.S. PATENT DOCUMENTS

| 9,918,204 | B1 | 3/2018 | St Phane et al. | |
| 2005/0148342 | A1* | 7/2005 | Sylvain | H04L 67/52 455/456.3 |
| 2011/0187744 | A1* | 8/2011 | Kim | A63F 13/332 709/219 |
| 2012/0293547 | A1 | 11/2012 | Bai et al. | |
| 2013/0135344 | A1* | 5/2013 | Stirbu | G06F 16/972 345/629 |

(Continued)

FOREIGN PATENT DOCUMENTS

| CN | 102843349 A | 12/2012 |
| CN | 103391462 A | 11/2013 |

(Continued)

OTHER PUBLICATIONS

Tan et al., "Location-Based Augmented Reality for Mobile Learning: Algorithm, System, and Implementation" (Year: 2015).*

(Continued)

*Primary Examiner* — Hilina K Demeter
(74) *Attorney, Agent, or Firm* — WHDA, LLP (57) ABSTRACT

The solution illustrated herein enables provision of applications, for example, augmented reality applications, to a user node automatically or at least semi-automatically based on location of the user node. The user node sends a request comprising location information of the user node to a network node. The network node has mapped geographical coordinates into a plurality of zones. Based on the request comprising the location information, the network node identifies one or more zones and transmits program content provider information associated with the one or more zones to the user node.

9 Claims, 5 Drawing Sheets

(56) References Cited

U.S. PATENT DOCUMENTS

2014/0164922 A1* 6/2014 Soon-Shiong ........ G06T 19/006
　　　　　　　　　　　　　　　　　　　　715/716
2017/0208109 A1* 7/2017 Akselrod .............. G06T 19/006

FOREIGN PATENT DOCUMENTS

| CN | 106816077 A | 6/2017 |
| CN | 108027649 A | 5/2018 |
| CN | 108292040 A | 7/2018 |
| EP | 2355440 A1 | 8/2011 |
| EP | 2712213 A1 | 3/2014 |
| WO | 2014031899 A1 | 2/2014 |

OTHER PUBLICATIONS

Ntentional Search Report dated Mar. 28, 2019, issued in counterpart Application No. PCT/EP2018/071131. (15 pages).
Office Action dated Jun. 29, 2021, issued in counterpart CN application No. 201880096096.2, with English translation. (24 pages).

\* cited by examiner

PROVIDING LOCATION-BASED AUGMENTED REALITY CONTENT

CROSS-REFERENCE TO RELATED APPLICATIONS

This application is a continuation of International Application No. PCT/EP2018/071131, filed on Aug. 3, 2018, the disclosure of which is hereby incorporated by reference in its entirety.

TECHNICAL FIELD

The present application relates to the field of information technology, and more particularly to a solution for providing program content associated with real world locations.

BACKGROUND

Augmented reality refers to an enhanced version of reality where live direct or indirect views of physical real-world environments are augmented with superimposed computer-generated images over a user's view of the real-world, thus enhancing one's current perception of reality. Augmented reality content may be used, for example, as a tool assisting in everyday activities or for entertainment as a game. Typically, augmented reality use cases are bound to single applications. This means, that a user needs to find and download an application before the user can utilize its content. This can be annoying and tiresome to the user, as one needs to make an effort in seeking applications of interest, download them, and run them individually each time when needed.

Based on the above, there is a need for a solution that would allow easier download of applications.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a solution for at least semi-automating the process of providing program content for a user based on location. A user node, a network node, and methods, are provided for providing location-bound program content for the user.

This objective is achieved by the features of the independent claims. Further embodiments and examples are apparent from the dependent claims, the description and the figures.

According to a first aspect, a user node for providing program content associated with location information is provided. The user node comprises at least one processing unit and at least one memory. The at least one memory comprises program instructions that are executed on the at least one processing unit to cause the user node to obtain location information associated with the user node; automatically generate a request comprising the location information; transmit the request to a network node for program content associated with the location information; and receive from the network node a response comprising program content provider information comprising network address information and content description of one or more program content provider associated with the location information. User experience may be enhanced by the automated process for receiving relevant program content provider information based on the location information.

In an implementation form of the first aspect, the program instructions that are executed on the at least one processing unit further cause the user node to submit a request for program content to at least one program content provider based on the network address information; and receive from the at least one program content provider program content in response to the request. This enables a solution where program content associated with the location information may be provided for the user automatically by the user node or semi-automatically based on a user selection.

In a further implementation form of the first aspect, the program content comprises an executable program and geographical coordinates, and wherein the program instructions that are executed on the at least one processing unit further cause the user node to execute the executable program that creates executed program content; and composite the executed program content based on the geographical coordinates into a single augmented reality scene with a volumetric compositor. The program content may be executed and composited automatically once received by the user node to provide location based augmented reality experience for the user.

In a further implementation for of the first aspect, the program instructions that are executed on the at least one processing unit further cause the user node to composite notifications associated with the user node on top of the augmented reality scene as an overlay. This enables a solution where notifications may coexist in the same scene with the program content without hampering the user experience.

In a further implementation for of the first aspect, the program instructions that are executed on the at least one processing unit further cause the user node to filter the received program content provider information based on a content policy associated with the user node. Thus, the received program content may be automatically filtered to provide only desired or allowed content for the user.

In a further implementation form of the first aspect, the program instructions that are executed on the at least one processing unit further cause the user node to detect a change in the location information and automatically transmit a new request comprising the changed location information to the network node for program content associated with the changed location information. Thus, the program content may be updated based on a change in the location information for providing relevant content associated with the changed location.

In a further implementation form of the first aspect, the program instructions that are executed on the at least one processing unit further cause the user node to predict a change in the location information and automatically transmit a new request comprising the predicted location information to the network node for program content associated with the predicted location information. Thus, a change in the location information may be predicted and program content associated with the predicted location may be downloaded in advance for later display to the user. This enhances the user experience by providing a consistent augmented reality scene for the user when the user node is moving.

In a further implementation form of the first aspect, the program instructions that are executed on the at least one processing unit further cause the user node to automatically unload program content associated with earlier location information in response to the changed location information.

This enables a solution where program content which is no longer relevant may be automatically unloaded. This also improves memory consumption of the user node.

In a further implementation form of the first aspect, the location information comprises geographical coordinates obtained with at least one of a Global Navigation Satellite System (GLASS), a Wi-Fi based positioning technique or a cellular location technique. This enables providing location-based program content associated with real-world locations.

In a further implementation form of the first aspect, the location information comprises a geographical zone identifier identifying a geographical zone associated with geographical coordinates. This enables receiving program content associated with a geographical area for seamless user experience with relevant content for the corresponding zone.

In a further implementation form of the first aspect, the new changed location information comprises a plurality of geographical zone identifiers in response to detecting geographical coordinates in the vicinity of a border of one or more geographical areas. Thus, change of zones may be predicted and program content associated with multiple zones may be provided for the user. This enhances the augmented reality scene when approaching zone borders.

According to a second aspect, a network node for providing program content associated with location information is provided. The network node comprises at least one processing unit and at least one memory. The at least one memory comprises program instructions that are executed on the at least one processing unit to cause the network node to obtain zone information comprising a plurality of zones, each zone being mapped to a geographical area associated with geographical coordinates; receive program content provider information from a plurality of program content providers, the program content provider information comprising, geographical coordinates, network address information and a content description of content provided by the program content provider; receive from a user node a request comprising location information for program content associated with the location information; determine one or more zones associated with the location information; and transmit program content provider information associated with the one or more zones to the user node. This enables mapping program content to specific geographical locations and providing program content, associated with the location information of the user node to the user node.

In an implementation form of the second aspect, the location information comprises geographical coordinates or one or more geographical zone identifiers. Thus, program content associated with real-world location of the user node may be provided.

In a further implementation form of the second aspect, the location information comprises geographical coordinates in the vicinity of a border of one or more geographical areas; and the one or more zones associated with the location information comprises a zone associated to the geographical coordinates and zones in the vicinity of the geographical coordinates. Thus, change of zones may be predicted and program content associated with multiple zones may be provided for the user node. This enhances the augmented reality scene when approaching zone borders.

According to a third aspect, a method for providing location-bound augmented reality content is provided. The method comprises obtaining location information of the user node; automatically transmitting a request comprising the location information to a network node for program content associated with the location information; and receiving from the network node a response comprising program content provider information comprising network address information and content description of one or more program content provider associated with the location information. User experience may be enhanced by the automated process for receiving relevant program content provider information based on the location information.

In an implementation form of the third aspect, the method further comprises submitting a request for program content to at least one program content provider based on to the network address information; and receiving from the at least one program content provider program content in response to the request. This enables a solution where program content associated with the location information may be provided for the user automatically by the user node or semi-automatically based on a user selection.

In a further implementation form of the third aspect, the program content comprises an executable program and geographical coordinates, and the method further comprises executing the executable program to create executed program content; and compositing the executed program content based on the geographical coordinates to a single augmented reality scene with a volumetric compositor. The program content may be executed and composited automatically once received by the user node to provide location-based augmented reality experience for the user.

In a further implementation form of the third aspect, the method further comprises filtering the received program content provider information based on a content policy associated with the user node. Thus, the received program content may be automatically filtered to provide only desired or allowed content for the user.

In a further implementation form of the third aspect, the method further comprises compositing notifications associated with the user node on top of the augmented reality scene as an overlay. This enables a solution where notifications may coexist in the same scene with the program content without hampering the user experience.

In a further implementation form of the third aspect, the location information comprises geographical coordinates obtained with at least one of a Global Navigation Satellite System (GNSS) or cellular location technique. This enables providing location-based program content associated with real-world locations.

In a further implementation form of the third aspect, the location information comprises a geographical zone identifier, the geographical zone identifier identifying a geographical area associated with geographical coordinates. This enables receiving program content associated with a geographical area far seamless user experience with relevant content for the corresponding zone.

In a further implementation form of the third aspect, the method further comprises detecting a change in the location information; and automatically transmitting a new request comprising the changed location information to the network node for program content associated with the new changed location information. Thus, the program content may be updated based on a change in the location information for providing relevant content associated with the changed location.

In a further implementation form of the third aspect, the new changed location information comprises a plurality of geographical zone identities in response to detecting geographical coordinates in the vicinity of a border of one or more geographical areas. Thus, change of zones may be predicted and program content associated with multiple zones may be provided for the user. This enhances the augmented reality scene when approaching zone borders.

In a further implementation form of the third aspect, the method further comprises automatically unloading the program content associated with the earlier location information in response to detecting the change in the location information, wherein the new changed location information comprises geographical coordinates associated with a new geographical area in the distance of the border of the geographical area associated with the earlier location information. This enables a solution where program content which is no longer relevant may be automatically unloaded. This also improves memory consumption of the user node.

According to a fourth aspect, a method for providing location-bound augmented reality content is provided. The method comprises obtaining zone information comprising a plurality of zones, each zone being mapped to a geographical area associated with geographical coordinates; receiving program content provider information from a plurality of program content providers, the program content provider information comprising geographical coordinates, network address information and a content description of content provided by the program content provider; receiving from a user node a request comprising location information for program content associated with the location information; determining one or more zones associated with the location information; and transmitting program content provider information associated with the zones to the user node. This enables mapping program content to specific geographical locations and providing program content associated with the location information of the user node to the user node.

In an implementation form of the fourth aspect, the location information comprises geographical coordinates or one or more geographical zone identifiers. Thus, program content associated with real-world location of the user node may be provided. Thus, change of zones may be predicted and program content associated with multiple zones may be provided for the user node. This enhances the augmented reality scene when approaching zone border's.

In a further implementation form of the fourth aspect, the location information comprises geographical coordinates in the vicinity of a border of one or more geographical areas; and the one or more zones associated with the location information comprises a zone associated to the geographical coordinates and zones in the vicinity of the geographical coordinates.

According to a fifth aspect, there is provided a computer program comprising program code configured to perform a method according to the third or fourth aspect, when the computer program is executed on a computing device.

According to a sixth aspect, there is provided a computer readable medium comprising a computer program comprising program code configured to perform a method according to the third or fourth aspect, when the computer program is executed on a computing device.

BRIEF DESCRIPTION OF THE DRAWINGS

In the following examples are described in more detail with reference to the attached figures and drawings, in which.

DETAILED DESCRIPTION

In the following description, reference is made to the accompanying drawings, which form part of the disclosure, and in which are shown, by way of illustration, specific aspects and examples in which the present subject-matter may be placed. It is understood that other aspects may be utilized and structural or logical changes may be made without departing from the present subject-matter. The following detailed description, therefore, is not to be taken in a limiting sense, as the present subject-matter is defined in the appended claims.

For instance, it is understood that a disclosure in connection with described methods may also hold true for a corresponding devices or systems configured to perform the method and vice versa. For example, if a specific method step is described, a corresponding device may include a unit or other means to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various exemplary aspects described herein may be combined with each other, unless specifically noted otherwise.

The purpose of the solution is to provide a distributed system for providing program content for users based on location. For example, augmented reality (AR) experiences provided for consumers are typically application specific. These experiences are limited to the application running, and the terminal or user node cannot run other experiences simultaneously. For example, a shopping center might want to provide an augmented reality application, but it is only relevant within the shopping center property. Downloading a desired application manually from an application store is a complicated process for the user and the user might not bother to download the application at all.

The solution illustrated herein enables provision of applications, for example, augmented reality applications, automatically or at least semi-automatically to a user node based on location of a user node.

Figure 1:
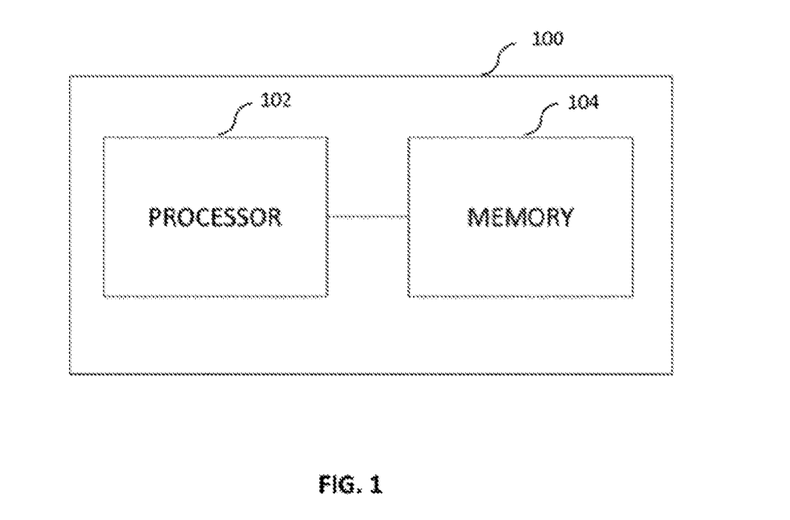
FIG. 1 illustrates a schematic representation of a user node for providing location-bound program content according to an aspect.

FIG. 1 illustrates schematic representation of a user node 100 for providing location-bound program content according to an aspect. The user node 100 may be an augmented reality (AR) terminal, such as augmented reality glasses, a mobile phone, a tablet, or any other hand-held device capable of running augmented reality content.

The user node 100 comprises at least one processing unit 102 and at least one memory 104. The at least one memory 104 comprises program instructions which, when executed on the at least one processing unit 102, cause the user node 100 to obtain location information associated with the user node 100; automatically generate a request comprising the location information; transmit the request to a network node for program content associated with the location information; and receive from the network node a response comprising program content provider information comprising network address information and content description of one or more program content provider associated with the location information. The content description may comprise information about a content type of program content, for example, an application, a mini-application that may perform a specific and a limited function associated to another application, or an advertisement that may be directly supplied as JavaScript object to the user node. The program content may be, for example, applications and objects (for, example JavaScript objects for advertisements).

The at least one memory 104 may comprise program instructions that, when executed on the at least one processing unit 102, causes the user node 100 to submit a request for program content to at least one program content provider based on the network address information; and receive from the at least one program content provider program content in response to the request. The request may be submitted by a user or automatically by the user node 100. For example, the user may select to load an application with a single gesture (for example, a virtual click), and the application gets dynamically loaded and started and the augmented reality experience is provided at the location.

The program content may comprise an executable program and geographical coordinates. The at least one memory 104 may further comprise program instructions that, when executed on the at least one processing unit 102, causes the user node 100 to execute the executable program and composite with a volumetric compositor executed program content based on the geographical coordinates into a single augmented reality scene. When composited with the volumetric compositor, the program content may be composited as part of the real-world scene. Each object may have individual z-coordinates, and, for example, an advertisement may be composited as part of a wall of a building. In other words, the objects are not implemented as parts of the scene, thus enhancing the user's perception of the reality in a conceivable manner.

The at least one memory 104 may comprise program instructions that, when executed on the at least one processing unit 102, causes the user node 100 to filter the received program content provider information based on a content policy associated with the user node 100. The content policy may comprise, for example, preferred content types of the program content or a list of accepted or blocked program content providers based on their network addresses stored in the at least one memory 104. The preferred content types may be managed, for example, by means of Artificial Intelligence techniques. The user node 100 may therefore learn, for example, usage preferences of the user and automatically hide content in which the user may not be interested in, and/or automatically download the content the user may want. For example, when a user approaches a bus stop, a location-bound bus stop content may be loaded automatically. The artificial intelligence based system may know the likely destination of the user at the bus stop, and timetables of those busses the user is typically interested in may be shown to the user.

The at least one memory 104 may comprise program instructions that, when executed on the at least one processing unit 102, causes the user node 100 to composite notifications associated with the user node 100 on top of the augmented reality scene as an overlay. For example, a user may receive a phone call while the received program content is running. A notification of the phone call may be composited as a layer on top of the augmented reality scene. When the user answers the phone call, the overlay may disappear. The z-coordinate of the notification of the phone call may be closer to the origin (that may be placed in a center of the scene to the position of the user) than the augmented reality applications that exist at the same time in the scene. Thus, the phone functionality may not hamper the user experience, but can coexist in the same scene. In addition to receiving a phone call, any other notifications generated by the device the MET is using for receiving the program content may be composited to the scene to serve the user.

The location information may comprise geographical coordinates obtained with at least one of a Global Navigation Satellite System (GNSS), a Wi-Fi based positioning technique or a cellular location technique. In an embodiment, the location information may comprise a geographical zone identifier, the geographical zone identifier identifying a geographical zone associated with geographical coordinates. In one embodiment, the geographical zones may form a grid comprising a manageable number of zones associated with real-world locations. In other words, each zone may be associated with a specific real-word geographical area.

The at least one memory 104 may comprise program instructions that, when executed on the at least one processing unit 102, causes the user node 100 to detect a change in the location information; and automatically transmit a new request comprising the changed location information to the network node for program content associated with the changed location information. The change in the location information may be detected, for example, based on obtaining a new geographical zone identifier associated with the user node 100. By automatically transmitting the new request in response to the changed location information, the user experience may not be abrupted for example, when the user node moves from one geographical zone to another with different location-bound program content. The program content of the previous geographical zone and the next (i.e. current) geographical zone may be executed and shown to the user simultaneously.

In an embodiment, the at least one memory 104 may comprise program instructions, that, when executed on the at least one processor 102, cause the user node 100 to predict a change in the location information; and automatically transmit a new request comprising the predicted location information to the network node for program content associated with the predicted location information. The predicted location information may be, for example, a geographical zone identifier that is different than the geographical zone identifier associated with the current location. The predicted location information may also comprise a plurality of geographical zone identifiers in response to the user node 100 predicting geographical coordinates in the vicinity of a border of one or more geographical areas. Thus, the user node 100 may predict that the user is about to enter to a new geographical zone or zones and therefore the new request may be transmitted for program content. The prediction may be based on, for example, direction and velocity associated with the user node. The direction and velocity may be determined based on the obtained location information. Further, the program content associated with the predicted geographical zone(s) may be shown simultaneously with the program content associated with the current geographical zone. Hence, seamless user experience may be provided for the user.

In addition, in one embodiment the at least one memory 104 may comprise program instructions that, when executed on the at least one processing unit 102, causes the user node 100 to automatically unload the program content associated with the earlier location information in response to the changed location information. For example, when a user has entered from one geographical zone to another geographical zone, the program content of the earlier zone may be gradually dropped or deleted from a memory of the user node. Thus, the program content that is no longer relevant due to the change in location may be automatically unloaded or deleted. The user node 100 controls the user experience and the zone handovers based on the obtained location information.

Figure 2:
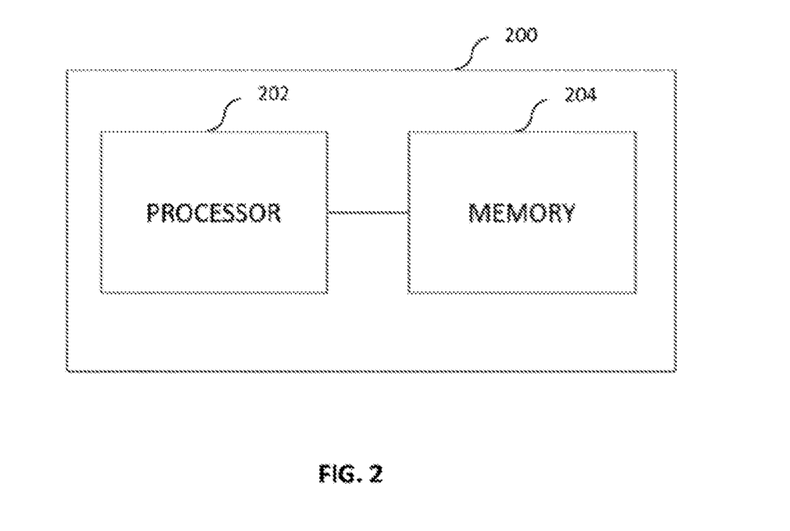
FIG. 2 illustrates a schematic representation of a network node for providing location-bound program content according to an aspect.

FIG. 2 illustrates schematic representation of a network node 200 for providing location-bound program content according to an aspect.

The network node 200 comprises at least one processing unit 202 and at least one memory 204. The at least one memory 204 comprises program instructions that, when executed on the at least one processing unit 202, causes the network node 200 to obtain information about a plurality of zones, each zone being mapped to a geographical area associated with geographical coordinates and identified by a geographical zone identifier; receive program content provider information from a plurality of program content providers, the program content provider information comprising geographical coordinates, network address information and a content description of content provided by the program content provider; receive from a user node a request comprising location information for program content associated with the location information; determine one or more zones associated with the location information; and transmit program content provider information associated with the one or more zones to the user node. The location information may comprise geographical coordinates or one or more geographical zone identifiers associated with the user node. The program content provider information may comprise information about a content type of program content, for example, an application, a mini-application that may perform a specific and a limited function associated to another application, or an advertisement that may be directly supplied as JavaScript object to the user node.

Figure 3:
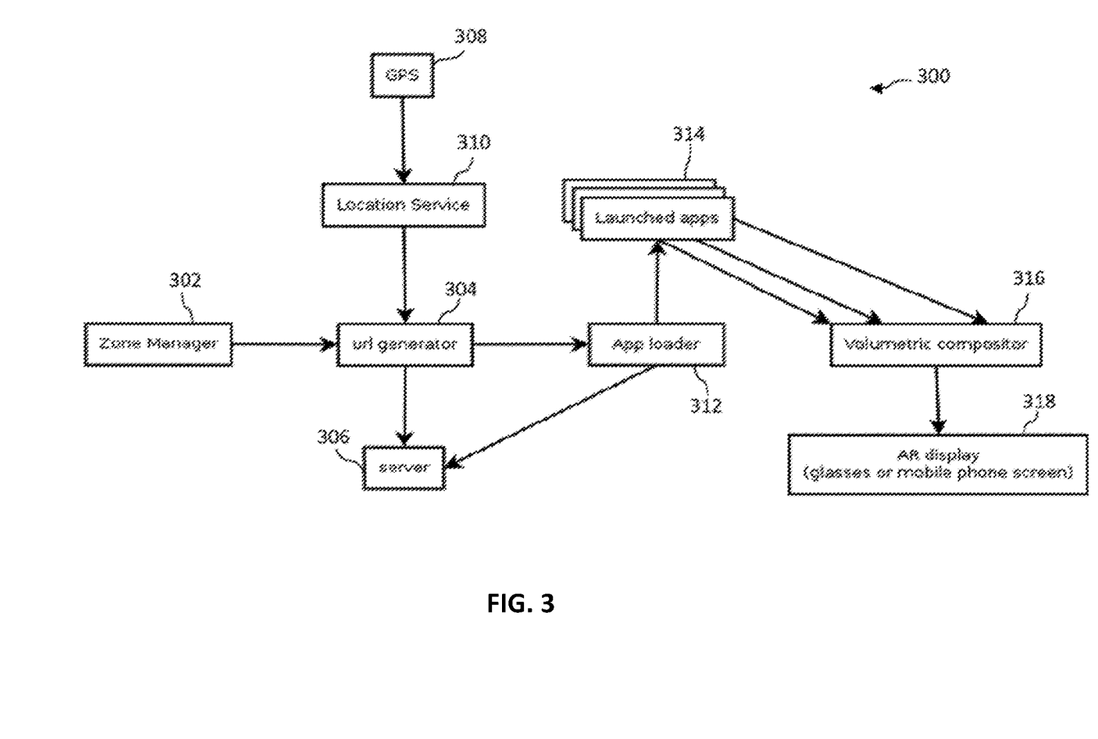
FIG. 3 illustrates a schematic representation of an architecture for dynamic program content loading.

FIG. 3 illustrates schematic representation of an architecture of a system 300 for dynamic program content loading.

The system 300 comprises a zone manager 302 which may divide the real world into a manageable number of geographical zones. The division may be implemented, for example, with WGS84 algorithm. Each of the geographical zones may have an individual location-based URL, which URL may be used to get program content provider information from a server. The functions of the zone manager 302 may be implemented by a user node, a network node, both the user and the network node, or by a separate zone manager. A geographical zone may be identified by a zone identifier that can be by an URL generator 304 for generating URLs which are resolved into network addresses. The network addresses may be, for example, IP addresses which link to servers that provide program content, such as dynamic augmented reality content. The URL encoded from the formed geographical zone identity may be, for example, arweb://zoneid. The URLs are not entered by the user, but instead generated based on the geographical location information. The geographical location information may comprise geographical coordinates obtained, for example, with GNSS such as GPS 308, and Location Service 310.

The system 300 may comprise additional systems for managing content. For example, artificial intelligence may be used for filtering the content. A 3D volumetric compositor 316 may be used for compositing multiple augmented reality contents 314 to the same scene.

The system 300 may comprise a name service that resolves the human readable URLs that specify the geographical zone identities to network addresses. This can be accomplished without implementing a new Internet protocol by using, for example, REST-API calls to a server 306 that functions as the name service for the program content. The program content providers may publish their IP addresses to the name service using the REST-API. The same could be also implemented as Internet protocol similar to Hypertext Transfer Protocol (HTTP). The difference compared to HTTP is that the geographical zone identity will result in a program content provider information available in this zone URL. For example, when a user selects a program content, the system 300 opens a web request to the network address of the program content provider that was registered to the name service 306 under the current geographical zone identifier. The request may be also initiated automatically without an input from the user by an application loader 312.

The received program content is executed on the client side and the executed program content is composited with the volumetric compositor 316 to an augmented reality scene to the intended location in the real world. The program content may be rendered locally by using, for example, a Graphic Processing Unit (GPU) of an augmented reality display 318.

The programs may have multiple sub-programs. For example, a sub-program may be a virtual lever on a physical wall. The sub-program may have effect to the main program, which may be, for example, an augmented reality game. The game and its sub-programs may be dynamically loaded on demand in the real world, instead of them all being built into one application (i.e. the game). This allows also user created content, for example, items to a game that the game designer did not put there. The various program content may all be composited together with the volumetric 3D compositor 315 into the one scene that the user looks through the augmented reality display 318.

The client (and the downloaded program content) and the name service 306 do not need to be in constant connection. The connection may be only established for transferring the program content or the program content provider information for the given zone identity/identities, or for the request to download and run given program content. It may be possible to load program content from multiple program content providers to the one scene at one time. This may be performed, for example, in a case of miming an augmented reality game that has distributed sub-programs that work in conjunction with the game. The sub-programs may be loaded automatically when the main game application is running. The application may communicate to the application loader 312 that the sub-programs are to be loaded automatically, without the user's request. This may further allow a seamless experience for the user. Similar to the game example, other types of experiences may also be provided as a combination of the main application and the distributed sub-programs. For example, the user may walk towards a taxi stand that is empty (no taxis around). Based on the location information, the user may already have a taxi application running. Thus, instead of going to the taxi application, there may be a sub-program of the taxi application on the URL associated with the geographical zone identity of the current location, and the taxi application may have just informed the application loader 312 that the sub-programs of the taxi application are allowed to be downloaded and ran automatically. As the sub-program is executed, the user may perceive a virtual button available ("call taxi") at the taxi stand. The user may virtually click the "call taxi" button, without navigating to the taxi application program manually. The user is thus able to call the taxi without the taxi stand having a physical button and its wired or wireless connectivity.

As another example, the user may walk to a pizzeria. The system 300 may dynamically load pizzeria menu content. The user may select the pizza he wants and the payment transaction may be implemented via the system 300. This means that the user may not need to use a physical credit card for payment. If the user was simultaneously, for example, playing a location-based game, the game may not have to be interrupted. Instead, the game may be shown in the background, in the same scene, and the pizzeria application may be composited on top of the game.

A program content provider may choose to disable auto-load for program content of other program content providers. This function may be beneficial in games that depend on the user location and where a clutter of other augmented reality content in the scene is undesirable. For example, the user may be asked a question to allow to disable other content while playing the game. Hence, the game, even if it is a multi-program as described above, may be the owner of the scene.

Figure 4:
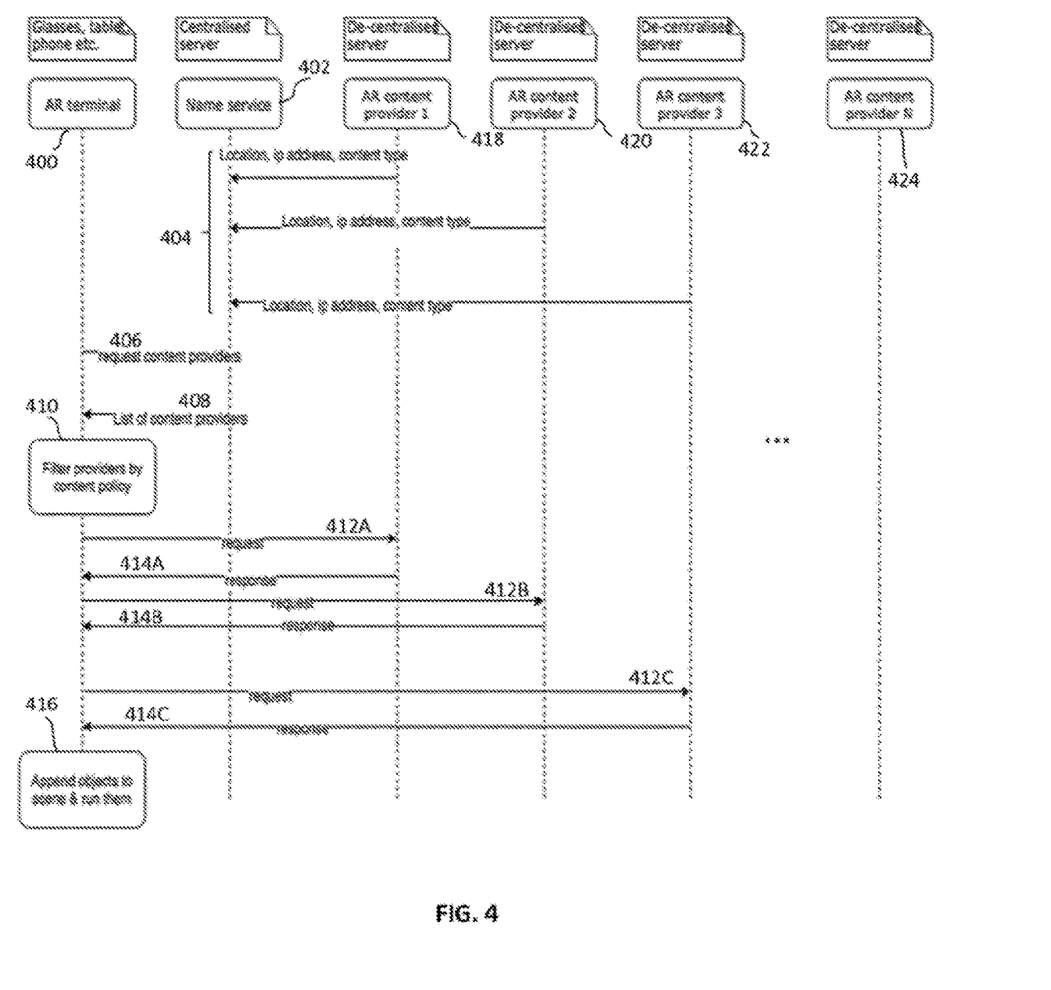
FIG. 4 illustrates a schematic representation of a protocol call architecture for providing program content based on location information.

FIG. 4 illustrates a schematic representation of a protocol call architecture for providing program content based on location information. Providing the program content based on the location information may be implemented using, for example, representational state transfer application programming interface (REST-API) call architecture, Content providers 418, 420, 422, 424 may register to a server 402 with REST-API call register.

At 404, each content provider 418, 420, 422, 424 may send information comprising their geographical location, IP address and content type information to a server 400 providing a name service. The location information of a content provider may be, for example, geographical coordinates or a geographical zone identifier identifying a geographical zone. A content type may be, for example, an application, a mini-application that may perform a specific and a limited function associated to another application, or an advertisement that may be directly supplied as JavaScript object to a client terminal 400. Each geographical zone may be mapped to a geographical area associated with specific geographical coordinates. Further, if the location information received from a content provider comprises geographical coordinates, the server 402 may associate the information received from the content provider with a corresponding geographical zone based on the geographical coordinates received from the content provider. The server 402 may be a centralized server. The content providers 418, 420, 422, 424 may be de-centralized servers.

The client terminal (i.e. user node) 400 sends to the server 402 a request 406 for program content, the request 406 comprising location information of the client terminal 400. The client terminal 400 may know its geographical zone identifier, and the location information may comprise the geographical zone identifier. Alternatively, the location information may comprise geographical coordinates obtained by and associated with the client terminal 400. The client terminal 400 may be an augmented reality (AR) terminal, such as augmented reality glasses, a mobile phone, a tablet, or any other hand-held device capable of running augmented reality content.

In response to the request 406, the server 402 sends a response 408 to the client terminal 400 comprising program content provider information associated with the location information of the client terminal 400. The server 402 may keep track on geographical zone identifiers and the geographical coordinates associated with the geographical zone identifiers, and associated program content that is mapped to each geographical zone. The program content provider information may comprise network addresses and content types of the program content providers associated with the location information received from the client terminal 400.

The client terminal 400 may then filter 410 the received program content provider information based on a content policy. The filtering may be based on, for example, one or more content types or the network addresses of the content providers. Then, a request 412A, 412B, 412C for program content may be sent for each program content provider 418, 420, 422, 424 based on the received (and filtered) program content provider information. The requests 412A, 412B, 412C may be sent to the content provider network addresses to a pre-defined port.

Next, the client terminal 400 may receive a response 414A, 414-B, 414C from each of the program content providers 418, 420, 422, 424 comprising the program content of the corresponding program content provider 418, 420, 422, 424. A response may comprise parameters, such as GPS coordinates and Java Script content. Thereafter, the user node 400 may append the received program content to an augmented reality scene and run them. For example, the client terminal 400 may run the JavaScript object (e.g. with WebGL) and composite it to a volumetric composited scene. The user may see the object, such as an advertisement, in its location based on the received geographical coordinates without making any web request by herself or without needing to make an effort to manually run an application.

When the client terminal 400 initiates requests for the servers, a network connection is established and closed after each request. The servers may then re-establish the connection towards the client terminal 400 when responding back. Thus, programs may be dynamically loaded to the client terminal 400 and run on it, instead of being streamed over the network. This enables a solution in which complex augmented reality experience may be provided for all users without overloading servers due to too many users using them simultaneously.

The benefit of the disclosed solution is that it may be implemented by configuring an existing web server to serve the AR content and a name service does not require any new method. Instead, it will work with just REST-API calls.

Figure 5:
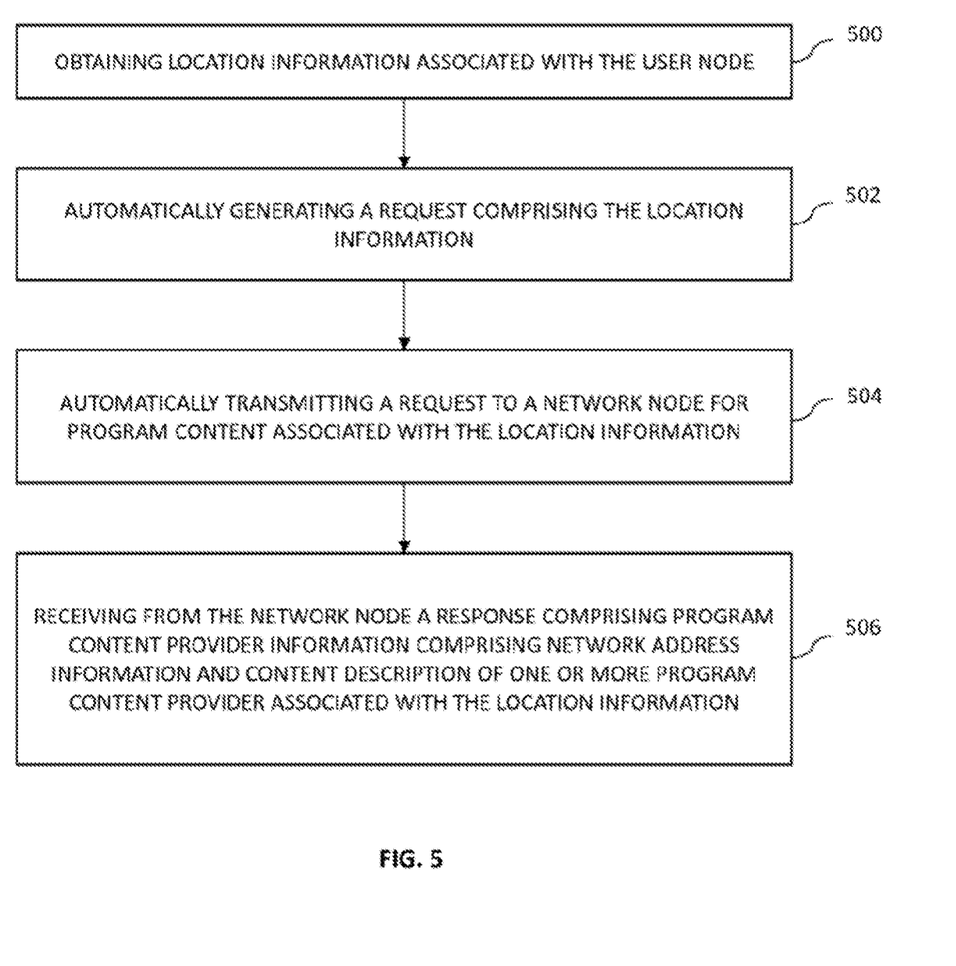
FIG. 5 illustrates a schematic representation of a flowchart of a method for providing location-bound program content according to an aspect.

FIG. 5 illustrates a schematic representation of a flowchart of a method for providing location-bound program content according to an aspect.

At 500, location information associated with a user node is obtained, At 502, a request comprising the location information is automatically generated. At 504, the request for program content associated with the location information is transmitted to a network node. At 506, a response comprising program content provider information comprising network address information and content description of one or more program content provider associated with the location information is received from the network node. The content description may comprise information about a content, type of program content, for example, an application, a mini-application that may perform a specific and a limited function associated to another application, or an advertisement that may be directly supplied as JavaScript object to the user node. The method illustrated in FIG. 5 may be implemented by the user node 100, 400 discussed in more detail with reference to FIGS. 1 and 4. Further, the user node 100, 400 may comprise a memory or memories storing at least one computer program comprising instructions that when executed by the processing unit or processor 102, cause the user node 100, 400 to perform the method.

Figure 6:
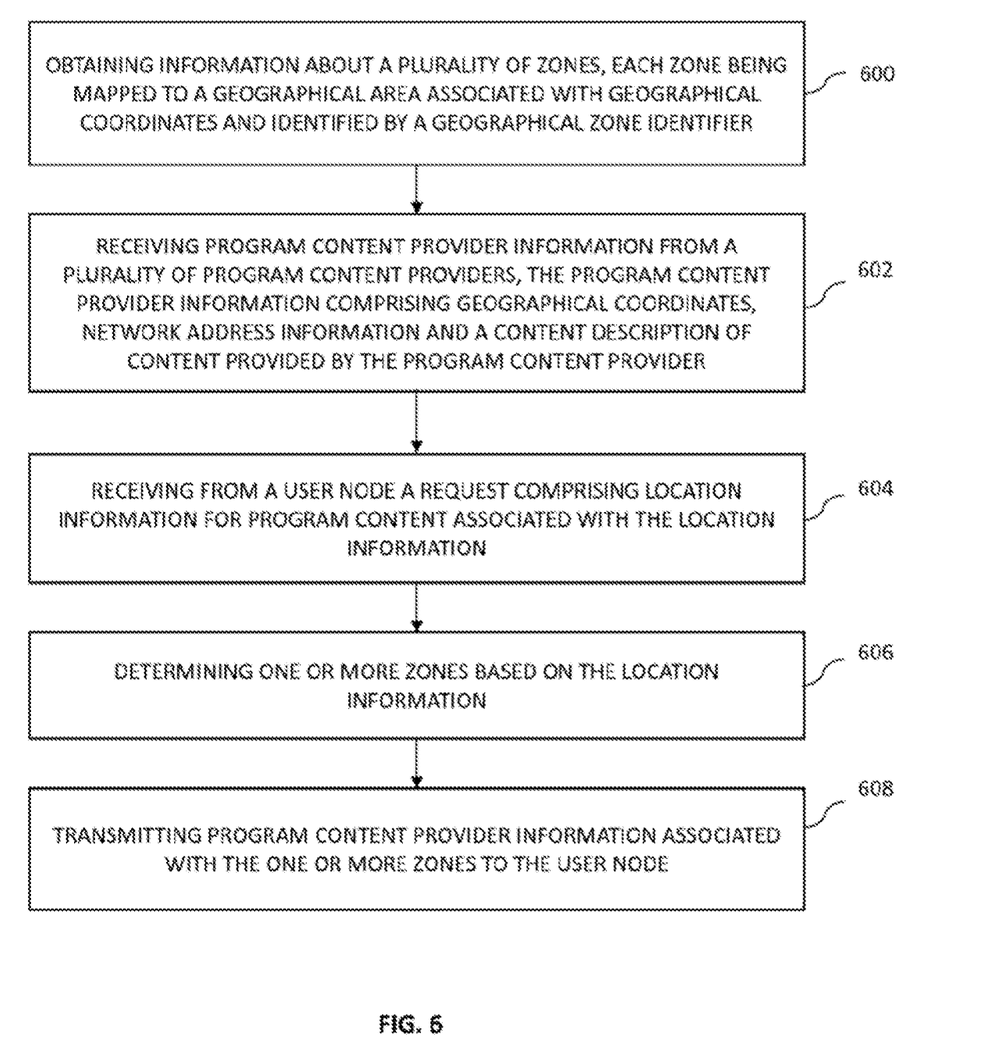
FIG. 6 illustrates a schematic representation of a flowchart of a method for providing location-bound program content according to an aspect.

FIG. 6 illustrates a schematic representation of a flowchart of a method for providing location-bound program content according to an aspect.

At 600, information is obtained about a plurality of zones, each zone being mapped to a geographical area associated with geographical coordinates and identified by a geographical zone identifier. At 602, program content provider information from a plurality of program content providers is received, the program content provider information comprising geographical coordinates, network address information and a content description of content provided by the program content provider. The content description may comprise information about a content type of program content, for example, an application, a mini-application that may perform a specific and a limited function associated to another application, or an advertisement that may be directly supplied as JavaScript object to a user node. At 604, a request is received from a user node, the request comprising location information for program content associated with the location information. At 606, one or more zones are determined based on the location information. At 608, program content provider information associated with the one or more zones is transmitted to the user node. The method illustrated in FIG. 6 may be implemented by the network node 200, 402 discussed in more detail with reference to FIGS. 2 and 4. Further, the network node 200, 402 may comprise a memory or memories storing at least one computer program co uprising instructions that when executed by the processing unit or processor 202, cause the network node 200, 402 to perform the method.

The functionality described herein can be performed, at least in parts by one or more computer program product components such as software components. According to an example, the apparatus may comprise a processor configured by the program code when executed to execute the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functionality of the apparatus may be implemented by program instructions stored on a computer readable medium. The program instructions, when executed, cause the computer, processor or the like, to perform the steps of the encoding and/or decoding methods. The computer readable medium can be any medium, including non-transitory storage media, on which the program is stored such as a Blu-Ray disc, DVD, CD, USB (flash) drive, hard disc, server storage available via a network, a ROM, a PROM, an EPROM, an EEPROM or a Flash memory having electronically readable control signals stored thereon which cooperate or are capable of cooperating with a programmable computer system such that an embodiment of at least one of the inventive methods is performed. An embodiment of the invention comprises or is a computer program comprising program code for performing any of the methods described herein, when executed on a computer. Another example of the invention comprises or is a computer readable medium comprising a program code that, when executed by a processor, causes a computer system to perform any of the methods described herein.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example or may relate to several examples. The examples are not limited to those that solve any or all of the stated problems or those that have any or all of the stated benefits and advantages. It will further be understood that reference to an item may refer to one or more of those items.

The steps of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term "comprising" is used herein to mean including the method, blocks or elements identified, but that such blocks or elements do not comprise an exclusive list and a method or apparatus may contain additional blocks or elements.

Although the invention and its advantages have been described in detail with reference to specific features and embodiments thereof, it is evident that various changes, modifications, substitutions, combinations and alterations can be made thereto without departing from the scope as defined by the appended claims. The specification and drawings are, accordingly, to be regarded simply as an illustration as defined by the appended claims, and are contemplated to cover any and all modifications, variations, combinations or equivalents that fall within the scope of the present subject matter.

The invention claimed is:

1. A user node comprising:
   at least one processing unit; and
   at least one memory,
   wherein the at least one memory comprises program instructions that are executed on the at least one processing unit to cause the user node to:
   obtain location information of the user node;
   automatically generate a request comprising the location information;
   transmit the request to a network node for program content associated with the location information;
   receive from the network node a response comprising program content provider information comprising network address information and content description of one or more program content providers associated with the location information;
   detect a change in the location information of the user node;
   automatically transmit a new request comprising the changed location information to the network node for program content associated with the changed location information; and automatically unload program content associated with earlier location information in response to the changed location information.

2. The user node of claim 1, wherein the program instructions that are executed on the at least one processing unit further cause the user node to:
submit a request for program content to at least one of the program content providers based on the network address information; and
receive from the at least one of the program content providers program content in response to the request.

3. The user node of claim 2, wherein the program content comprises an executable program and geographical coordinates, and wherein the program instructions that are executed on the at least one processing unit further cause the user node to:
execute the executable program that creates executed program content; and
composite the executed program content based on the geographical coordinates into a single augmented reality scene with a volumetric compositor.

4. The user node of claim 3, wherein the program instructions that are executed on the at least one processing unit further cause the user node to:
composite notifications associated with the user node on top of the augmented reality scene as an overlay.

5. The user node of claim 1, wherein the program instructions that are executed on the at least one processing unit further cause the user node to:
filter the received program content provider information based on a content policy associated with the user node.

6. The user node of claim 1, wherein the program instructions that are executed on the at least one processing unit further cause the user node to:
predict a change in the location information; and
automatically transmit a new request comprising the predicted location information to the network node for program content associated with the predicted location information.

7. The user node of claim 1, wherein the location information comprises geographical coordinates obtained with at least one of a Global Navigation Satellite System (GNSS), a Wi-Fi based positioning technique or a cellular positioning technique.

8. The user node of claim 1, wherein the location information comprises a geographical zone identifier identifying a geographical zone associated with geographical coordinates.

9. A method for providing location-bound augmented reality content, comprising:
obtaining location information of a user node;
automatically generating a request comprising the location information;
transmitting the request to a network node for program content associated with the location information;
receiving from the network node a response comprising program content provider information comprising network address information and content description of one or more program content providers associated with the location information;
detecting a change in the location information of the user node;
automatically transmitting, from the user node, a new request comprising the changed location information to the network node for program content associated with the changed location information; and
automatically unloading, at the user node, program content associated with earlier location information in response to the changed location information.

* * * * *